(12) United States Patent
Hestermann

(10) Patent No.: US 8,628,290 B2
(45) Date of Patent: Jan. 14, 2014

(54) MANIPULATOR HAVING A THREE-RING BEARING BETWEEN TWO OUTER PIVOT ARMS AND A PLATFORM

(75) Inventor: Joerg-Oliver Hestermann, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 509 days.

(21) Appl. No.: 12/739,191

(22) PCT Filed: Oct. 14, 2008

(86) PCT No.: PCT/EP2008/063762
§ 371 (c)(1),
(2), (4) Date: Aug. 2, 2010

(87) PCT Pub. No.: WO2009/053270
PCT Pub. Date: Apr. 30, 2009

(65) Prior Publication Data
US 2011/0002767 A1    Jan. 6, 2011

(30) Foreign Application Priority Data

Oct. 23, 2007 (DE) .......................... 10 2007 050 905

(51) Int. Cl.
*B25J 18/04* (2006.01)
*H01L 21/677* (2006.01)

(52) U.S. Cl.
USPC .................. 414/744.5; 74/490.01; 901/15

(58) Field of Classification Search
USPC .................. 414/744.5; 901/15; 384/461, 554; 74/490.01
See application file for complete search history.

(56) References Cited

U.S. PATENT DOCUMENTS

| 4,834,560 | A | * | 5/1989 | Jacob et al. | 384/461 |
| 4,984,959 | A | * | 1/1991 | Kato | 414/744.3 |
| 5,409,316 | A | * | 4/1995 | Ferguson | 384/447 |
| 5,725,352 | A | * | 3/1998 | Tanaka | 414/744.5 |
| 5,788,453 | A | * | 8/1998 | Donde et al. | 414/744.5 |
| 6,098,484 | A | * | 8/2000 | Bacchi et al. | 74/490.03 |
| 6,132,098 | A | * | 10/2000 | Zylla | 384/461 |
| 6,224,319 | B1 | | 5/2001 | Velikov et al. | |
| 6,464,448 | B1 | * | 10/2002 | Ha | 414/744.5 |
| 6,478,531 | B1 | * | 11/2002 | Yang | 414/744.3 |
| 6,499,936 | B2 | * | 12/2002 | Ishigame | 414/744.5 |
| 6,840,732 | B2 | * | 1/2005 | Minami et al. | 414/744.5 |
| 7,547,144 | B2 | * | 6/2009 | Kunimoto et al. | 384/447 |
| 2005/0117827 | A1 | * | 6/2005 | Fujii et al. | 384/510 |

FOREIGN PATENT DOCUMENTS

| DE | 196 03 701 A | 8/1997 |
| DE | 10 2004 035 587 A | 2/2006 |
| DE | 10 2007 014 130 | 9/2008 |
| EP | 0 316 998 A | 5/1989 |
| SU | 921 848 A | 4/1982 |
| SU | 1 627 401 A | 2/1991 |
| WO | 93/07997 A | 4/1993 |
| WO | 2007/122181 | 11/2007 |

* cited by examiner

*Primary Examiner* — Scott Lowe
(74) *Attorney, Agent, or Firm* — Lucas & Mercanti, LLP

(57) ABSTRACT

A handling device which has a first bearing device forming a pivot point for two inner pivot arms, to each of which one outer pivot arm is pivotally attached. The two outer pivot arms support a platform. The platform is pivotally connected to the outer pivot arms by an outer three-ring bearing.

10 Claims, 3 Drawing Sheets

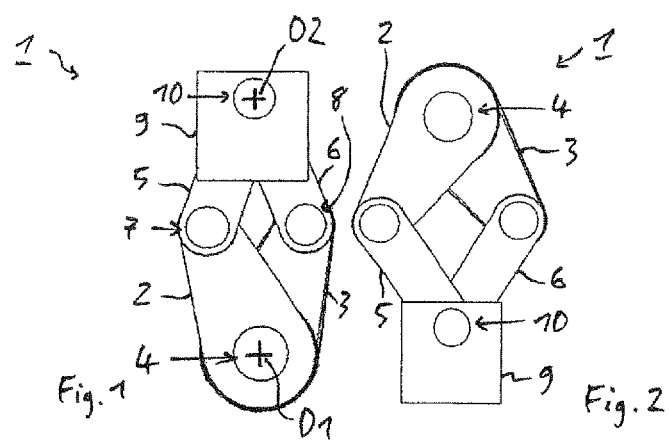
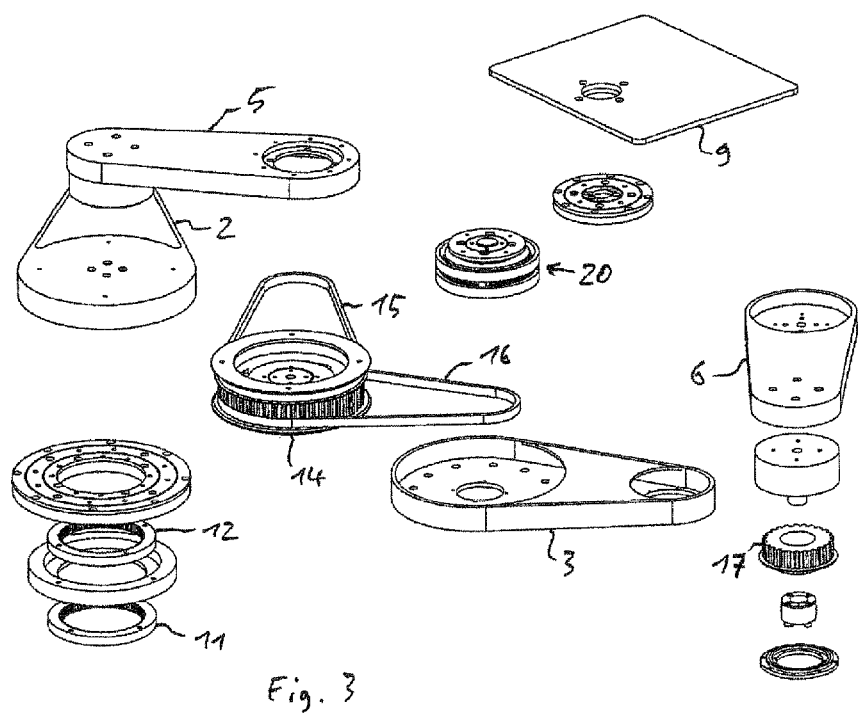

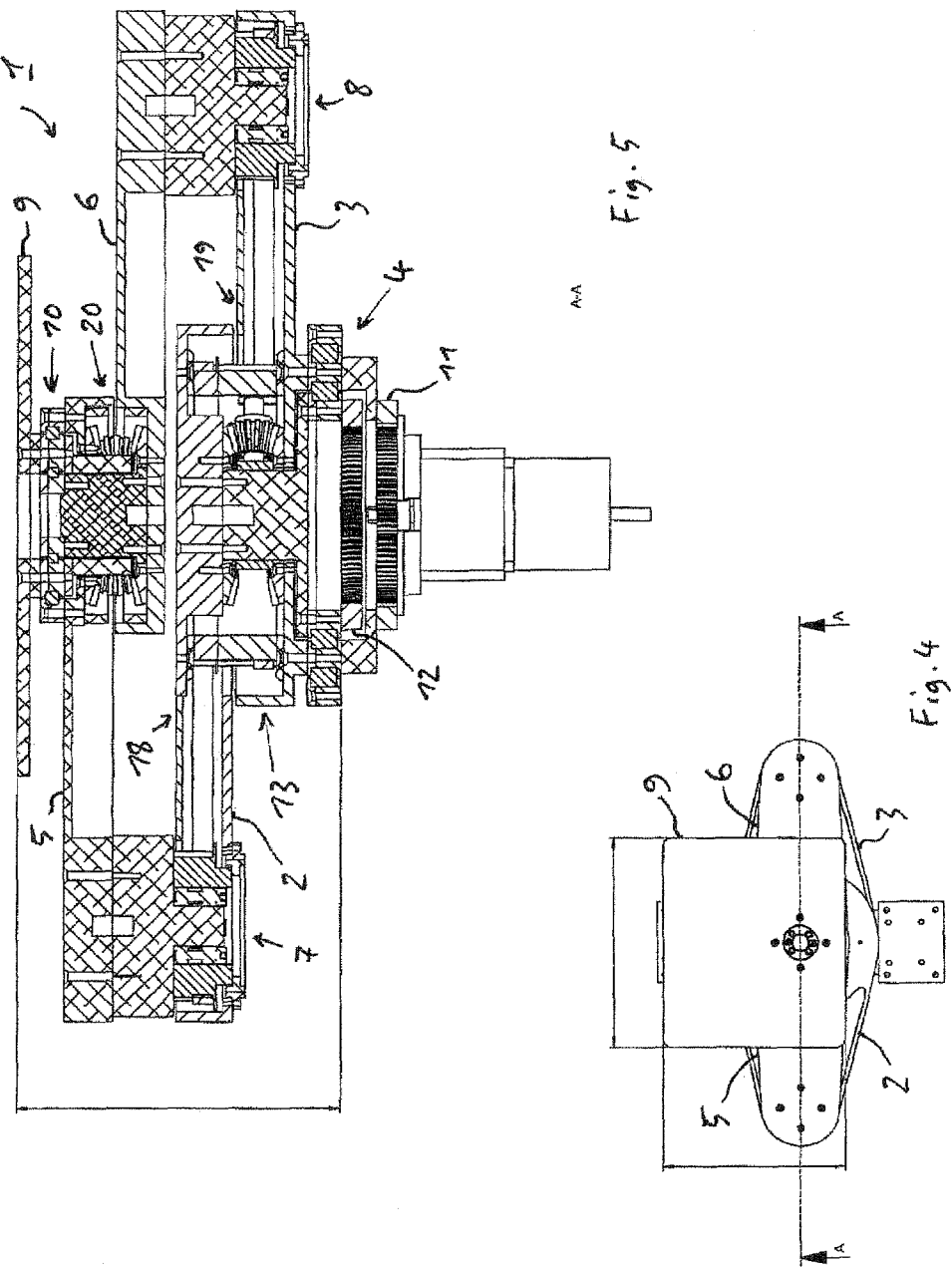

MANIPULATOR HAVING A THREE-RING BEARING BETWEEN TWO OUTER PIVOT ARMS AND A PLATFORM

This application is a 371 of PCT/EP2008/063762 filed Oct. 14, 2008, which in turn claims the priority of DE 10 2007 050 905.9 filed Oct. 23, 2007, the priority of both applications is hereby claimed and both applications are incorporated by reference herein.

FIELD OF THE INVENTION

The invention relates to a handling device suitable for handling for example electrical or electronic parts.

BACKGROUND OF THE INVENTION

A handling device according to the preamble of claim 1 is known for example from U.S. Pat. No. 6,224,319 B1. Said handling device comprises two inner arms which are pivotable about a common rotational axis and to which is articulatedly connected in each case one outer arm. The outer arms are coupled to a platform which can be used for example for transporting silicon wafers. The platform has two circular openings, in which is held in each case one bearing for connecting to an outer arm. With the device according to U.S. Pat. No. 6,244,319 B1, it is possible for the platform to be moved over and beyond the center of the device.

OBJECT OF THE INVENTION

The invention is based on the object of providing a handling device which has two inner arms which are pivotable about a common rotational axis and two outer arms which are connected to said inner arms and which together support a platform, which handling device allows the platform to be moved over and beyond the rotational axis of the inner arms and which is at the same time characterized by a particularly simple structural design.

SUMMARY OF THE INVENTION

Said object is achieved according to the invention by a handling device having the features of claim 1. The handling device has a first bearing device which defines an articulation point of two inner pivot arms, with in each case one outer pivot arm being articulatedly connected to those ends of the inner pivot arms which face away from the articulation point. The two outer pivot arms together support a platform which can be moved in a plane normal to the rotational axis of the first bearing device. The platform is pivotably connected to the two outer pivot arms by means of a single bearing device, specifically an outer three-ring bearing. The four pivot arms of the handling device thereby form, overall, a four-joint chain. The first bearing device is preferably designed, like the outer three-ring bearing, as a three-ring rolling bearing. Suitable rolling bodies for said bearing arrangements are for example balls or cylindrical rollers. In the latter case, the rolling bearing arrangements are preferably designed as crossed roller bearings. In any case, the different rolling body rows of a three-ring bearing may be arranged either in a common plane or in planes spaced apart from one another.

In a preferred embodiment, a synchronization pulley is arranged concentrically with respect to the first bearing device, which synchronization pulley is mechanically coupled to the inner pivot arms in such a way that, during a pivoting movement of an inner pivot arm relative to the synchronization pulley by a certain angle, the other inner pivot arm is pivoted relative to the synchronization pulley by the same angle but in the opposite direction. For example, a gear transmission, in particular a bevel gear transmission, is suitable for realizing said synchronization function. In this case, the synchronization pulley is fixedly connected, or is identical, to the bevel gear carrier. The rotational axis of the synchronization pulley corresponds to the rotational axis of the first bearing device, that is to say the inner pivot axis of the inner bearing arms.

In a particularly advantageous refinement, the synchronization pulley is designed as, or is rotationally fixedly connected to, a toothed belt pulley. The toothed belt pulley serves, together with a toothed belt and a second toothed belt pulley which is arranged concentrically with respect to the rotational axis between an inner pivot arm and an outer pivot arm, to synchronize the movement of the outer pivot arm with the movement of the inner pivot arm. The outer belt pulley, which is arranged at the center of rotation between the inner pivot arm and the outer pivot arm has half the diameter, and therefore half the number of teeth, in relation to the inner toothed belt pulley which is referred to as the synchronization pulley. It is also possible for a chain or some other traction mechanism to be used instead of a toothed belt.

Drive devices which can be actuated independently of one another are preferably provided for driving the inner pivot arms. When the two inner pivot arms are pivoted by the same magnitude but in opposite directions by means of the drive devices, then the platform moves along a straight line, while the synchronization pulley remains in an unchanged angular position. The four-joint chain, which has two degrees of freedom, can be positioned in a defined manner by means of the synchronization of the first inner pivot arm with the second inner pivot arm by means of the gear transmission, and the simultaneous synchronization of an inner pivot arm with the outer pivot arm, which is articulately connected thereto, by means of the belt drive. Two suitable parameters for positively defining the positioning of the pivot arms are for example the angular position of the synchronization pulley and the angle enclosed between the inner pivot arms.

The first bearing device, the two bearings between the inner pivot arms and the outer pivot arms and also the outer three-ring bearing are referred to summarily as joints of the handling device. Here, the joints arranged in each case between an inner pivot arm and an outer pivot arm constitute the central joints of the handling device. Assuming that the absolute angular position of each inner pivot arm can be adjusted separately by means of the respective drive device, no special synchronization between an inner and an outer pivot arm, for example by means of the above-explained belt drive, is required for the operation of the handling device. Since play within the handling device is however inevitable, such a synchronization contributes to an increase in precision, in particular in the repeat accuracy during the movement of the platform. In a particularly preferred embodiment, a mechanical synchronization, in particular by means of a belt drive, is provided not only between the first inner pivot arm and the first outer pivot arm which is articulatedly connected thereto but rather also between the second inner pivot arm and the second outer pivot arm. Although this theoretically results in overdetermination of the mechanical system, mechanical bracing is prevented as a result of the elasticity of the selected components, in particular belts.

The rotational axis of the first bearing device and the rotational axis of the outer three-ring bearing lie in a common plane, wherein, in a preferred embodiment, the platform is not rotatable relative to said plane. This means that the outer pivot arms, like the inner pivot arms, are moved symmetrically with respect to said plane at all times, while the platform is always intersected centrally by the plane. To achieve this, mechanical synchronization between one of the outer pivot arms and the platform is theoretically sufficient. It is however preferable for the two outer pivot arms simultaneously to be mechanically synchronized with the platform. Similarly to the synchronization device on the first bearing device, a gear transmission, in particular a bevel gear transmission, is suitable for performing said function. Here, in the case of the outer three-ring bearing, a synchronization pulley is rotationally fixedly connected to the platform.

An exemplary embodiment of the invention is explained in more detail below on the basis of a drawing, in which:

BRIEF DESCRIPTION OF THE DRAWINGS

FIG. 1 shows, in a simplified illustration, a plan view of a handling device in a first position;

FIG. 2 shows the handling device in a second position;

FIG. 3 shows an exploded illustration of the handling device;

FIG. 4 shows a plan view of the handling device in a central position;

FIG. 5 shows a section through the arrangement according to FIG. 4; and

DETAILED DESCRIPTION OF THE DRAWING

Figure 6:
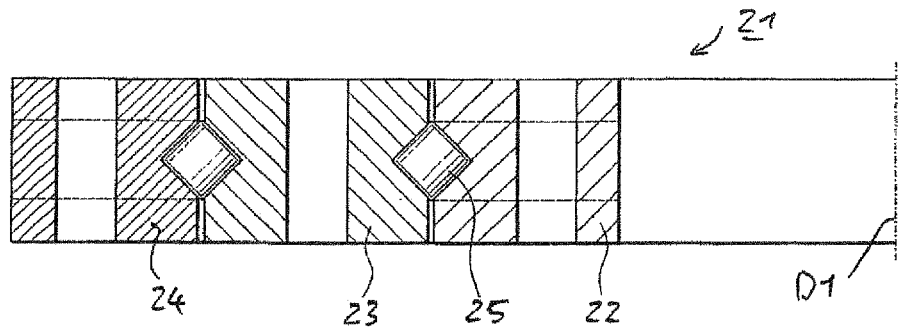
FIGS. 6-8 show different variants of a three-ring bearing of the handling device.

FIGS. 1 to 5 show a handling device 1, with regard to the basic function of which reference is made to the German patent application 10 2006 018 590.0. The handling device 1 has two inner pivot arms 2, 3 which can be pivoted, by means of a first bearing device 4, about a common rotational axis D1, which is generally positionally fixed. An outer pivot arm 5, 6 is articulatedly connected to each inner pivot arm 2, 3 by means of in each case one central bearing 7, 8, in particular a rolling bearing. The two outer pivot arms 5, 6 together support a platform 9, with said outer pivot arms being pivotably connected to said platform by means of an outer three-ring bearing 10 whose rotational axis is denoted by D2. The outer three-ring bearing 10, the first bearing device 4 which is likewise designed as a three-ring bearing, and the central bearings 7, 8 are referred to summarily as joints of the handling device 1 and, together with the pivot arms 2, 3, 5, 6, form a four-joint chain. As can be seen in particular from a comparison of FIGS. 1, 2, 5, it is possible for the platform 9 to be moved across the first bearing device 4, with the rotational axes D1, D2 coinciding in the arrangement according to FIG. 4.

Each inner pivot arm 2, 3 can be driven independently via a toothed ring 11, 12. Radial movements, pivoting movements or any desired combined movements of the platform 9 can thereby be realized. A synchronization pulley 14 is mechanically coupled via a bevel gear transmission 13 to the two toothed rings 11, 12, which are concentric with respect to the rotational axis D1. Said synchronization pulley 14 is a toothed belt pulley which, during a pivoting movement of the first inner pivot arm 2 by a first pivot angle and a simultaneous pivoting movement of the second inner pivot arm 3 by a second pivot angle, is rotated by half of the sum of the two pivot angles. For example, if the first inner pivot arm 2 is rotated by a certain pivot angle in a first direction and the second pivot arm 3 is simultaneously rotated by an angle of the same magnitude in the opposite direction, then the toothed belt pulley 14 remains in an unchanged angular position. Here, the platform 9 is moved exclusively in the radial direction in relation to the first rotational axis D1. Another extreme case is that in which both toothed rings 11, 12 are driven with corresponding angular speed in the same rotational direction: in this case, the angular relationship between the synchronization pulley 14 and the toothed rings 11, 12 remains unchanged. The second rotational axis D2 is thereby pivoted on a circular path relative to the first bearing device 4.

Laid around the synchronization pulley 14 are two toothed belts 15, 16 which run in each case within an inner pivot arm 2, 3 and are laid around a second belt pulley 17 which is rotationally fixedly connected to an outer pivot arm 5, 6. Corresponding to the desired synchronization between the outer pivot arm 5, 6 and the inner pivot arm 2, 3, the second belt pulley 17 has half the diameter in relation to the inner toothed belt pulley 14. With the bevel gear transmission 13 and the two traction mechanism drives which comprise the belts 15, 16 and which are denoted overall by the reference symbols 18, 19, the handling device 1 therefore comprises a total of three synchronization devices, which are to be assigned to the four-bar chain. A further synchronization device 20 ensures that the platform 9 remains at all times in an unchanged angular position in relation to a plane defined by the rotational axes D1 and D2. The synchronization device 20, similarly to the so-called inner synchronization device which comprises the synchronization pulley 14, is designed as a bevel gear transmission and is also referred to as the outer synchronization device.

Figure 7:
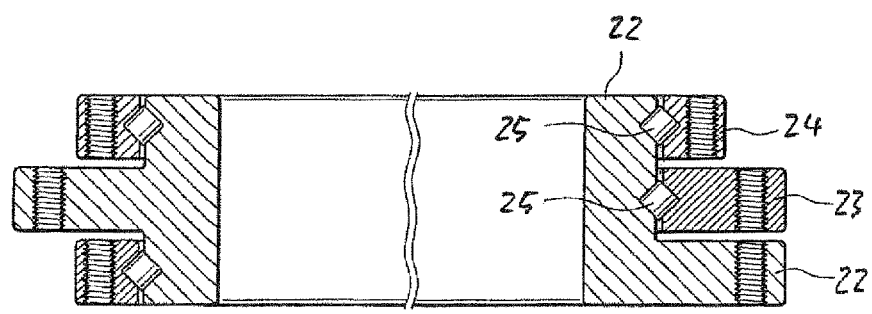
Figure 8:
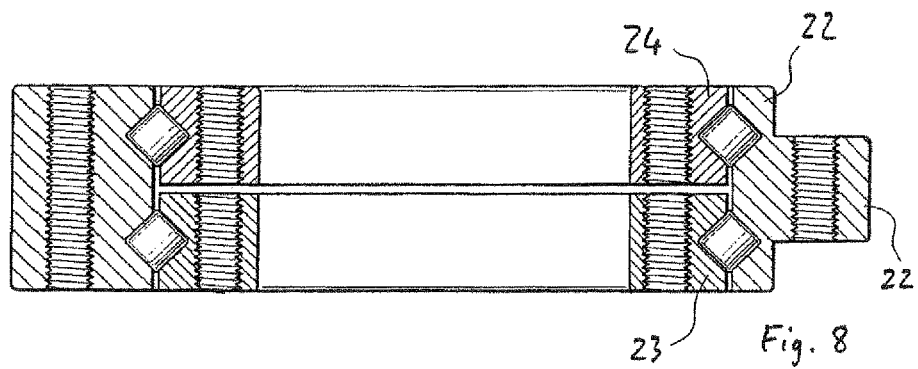

FIGS. 6 to 8 illustrate different possible designs of a three-ring bearing 21 which can be used both as a first bearing device 4 and also as an outer three-ring bearing 10 of the handling device 1. Each three-ring bearing 21 has a first ring 22 and, arranged concentrically with respect thereto, a second ring 23 and a third ring 24, with all the rings 22, 23, 24 being rotatable independently of one another. Cylindrical rollers are provided as rolling bodies 25 of the three-ring bearing 21; said bearings are crossed roller bearings. The three-ring rolling bearings 21 which are designed as crossed roller bearings are suitable for absorbing radial and axial loads and also for absorbing tilting moments. Where said three-ring bearing 21 is used as the first bearing device 4, the first ring 22 is for example arranged fixedly with respect to a frame while the two other rings 23, 24 are connected to the inner pivot arms 2, 3. In the case of the outer three-ring bearing 10, in contrast, the first ring 22 of the three-ring bearing 21 is for example rigidly connected to the platform 9, while the rings 23, 24 are screwed to the outer pivot arms 5, 6. On account of the two three-ring bearings 4, 10, the handling device 1 has a total of only four joints 4, 7, 8 and 10.

List of Reference Symbols

| | |
|---|---|
| 1 | Handling device |
| 2, 3 | Inner pivot arms |
| 4 | Bearing device |
| 5, 6 | Outer pivot arms |
| 7 | Central bearing |
| 8 | Central bearing |
| 9 | Platform |
| 10 | Outer three-ring bearing |
| 11, 12 | Concentric toothed rings |
| 13 | Bevel gear transmission |
| 14 | Synchronization pulley |
| 15, 16 | Toothed belts |

-continued

| 17 | Belt pulley |
| 18, 19 | Traction mechanism drives |
| 20 | Synchronization device |
| 21 | Three-ring bearing |
| 22 | First ring |
| 23 | Second ring |
| 24 | Third ring |
| 25 | Rolling bodies |
| D1, D2 | Rotational axes |

The invention claimed is:

1. A handling device, comprising:
a first bearing device which forms first articulation point between two inner pivot arms comprising a first inner pivot arm and a second inner pivot arm, the inner pivot arms each being articulatedly connected to an outer pivot arm and the outer pivot arms supporting a platform,
an outer three-ring bearing, wherein the platform is pivotably connected by the outer three-ring bearing to the outer pivot arms about a second articulation point, and
a gear transmission mechanically coupling the platform to the outer pivot arms such that the outer pivot arms are arranged symmetrically with respect to the platform at all times, whereby the platform remains in an unchanged angular position in relation to a plane defined by the and second articulation points.

2. The handling device of claim 1, wherein the outer three-ring bearing is a rolling bearing.

3. The handling device of claim 2, wherein the outer three-ring bearing is a crossed roller bearing.

4. The handling device of claim 1, wherein the first bearing device is a three-ring rolling bearing.

5. The handling device of claim 4, wherein the first bearing device is a crossed roller bearing.

6. The handling device of claim 1, further comprising: a synchronization pulley which is arranged concentrically with respect to the first bearing device and which is mechanically coupled to the inner pivot arms in such a way that, during a pivoting movement of the first inner pivot arm relative to the second inner pivot arm, said synchronization pulley co-rotates relative to each of the inner pivot arms by half of a pivot angle.

7. The handling device of claim 6, wherein the synchronization pulley is a toothed belt pulley.

8. The handling device of claim 6, wherein the synchronization pulley is coupled by means of a gear transmission to the inner pivot arms.

9. The handling device of claim 8, wherein the gear transmission is a bevel gear transmission.

10. The handling device of claim 1, wherein the gear transmission, which synchronizes pivoting movement of the outer pivot arms relative to the platform, is a bevel gear transmission.

* * * * *

UNITED STATES PATENT AND TRADEMARK OFFICE
CERTIFICATE OF CORRECTION

PATENT NO.       : 8,628,290 B2                                                          Page 1 of 1
APPLICATION NO.  : 12/739191
DATED            : January 14, 2014
INVENTOR(S)      : Joerg-Oliver Hestermann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 727 days.

Signed and Sealed this
Twenty-second Day of September, 2015

Michelle K. Lee
*Director of the United States Patent and Trademark Office*